United States Patent [19]

Ford

[11] Patent Number: 4,643,204
[45] Date of Patent: Feb. 17, 1987

[54] VEHICLE MOUNTED ARRANGEMENT FOR RECEIVING SMOKING RESIDUES OR THE LIKE

[76] Inventor: Johnny D. Ford, 1829 W. Seventh St., Owensboro, Ky. 42301

[21] Appl. No.: 542,265

[22] Filed: Oct. 17, 1983

[51] Int. Cl.[4] ......................... A24F 19/00; A24F 19/10
[52] U.S. Cl. ................................... 131/231; 131/232; 131/236; 131/237
[58] Field of Search ................. 131/231, 232, 236, 237

[56] References Cited

U.S. PATENT DOCUMENTS

| | | | |
|---|---|---|---|
| 2,716,464 | 8/1955 | Weisbecker | 131/231 |
| 2,754,145 | 7/1956 | Mackey | 131/236 |
| 3,186,414 | 6/1965 | Davis | 131/236 |

Primary Examiner—V. Millin
Attorney, Agent, or Firm—Warren D. Flackbert

[57] ABSTRACT

A receiving arrangement, typically mounted within a vehicle, adapted to receive and transmit smoking residues, as cigarettes or cigar ashes and/or butts, from within the passenger compartment to a storage receptacle disposed within the engine compartment. Exhaust means, associated with the storage receptacle, draws the refuse from the passenger compartment receiving area. A water supply at the bottom of the storage receptacle serves to receive heavier-than-air particles and, further, flame extinguishing purposes. Exit vents or areas in the storage receptacle permit passage of unwanted smoke (and airborne ash) from the smoking articles placed on the receiving container in the passenger compartment during use.

4 Claims, 4 Drawing Figures

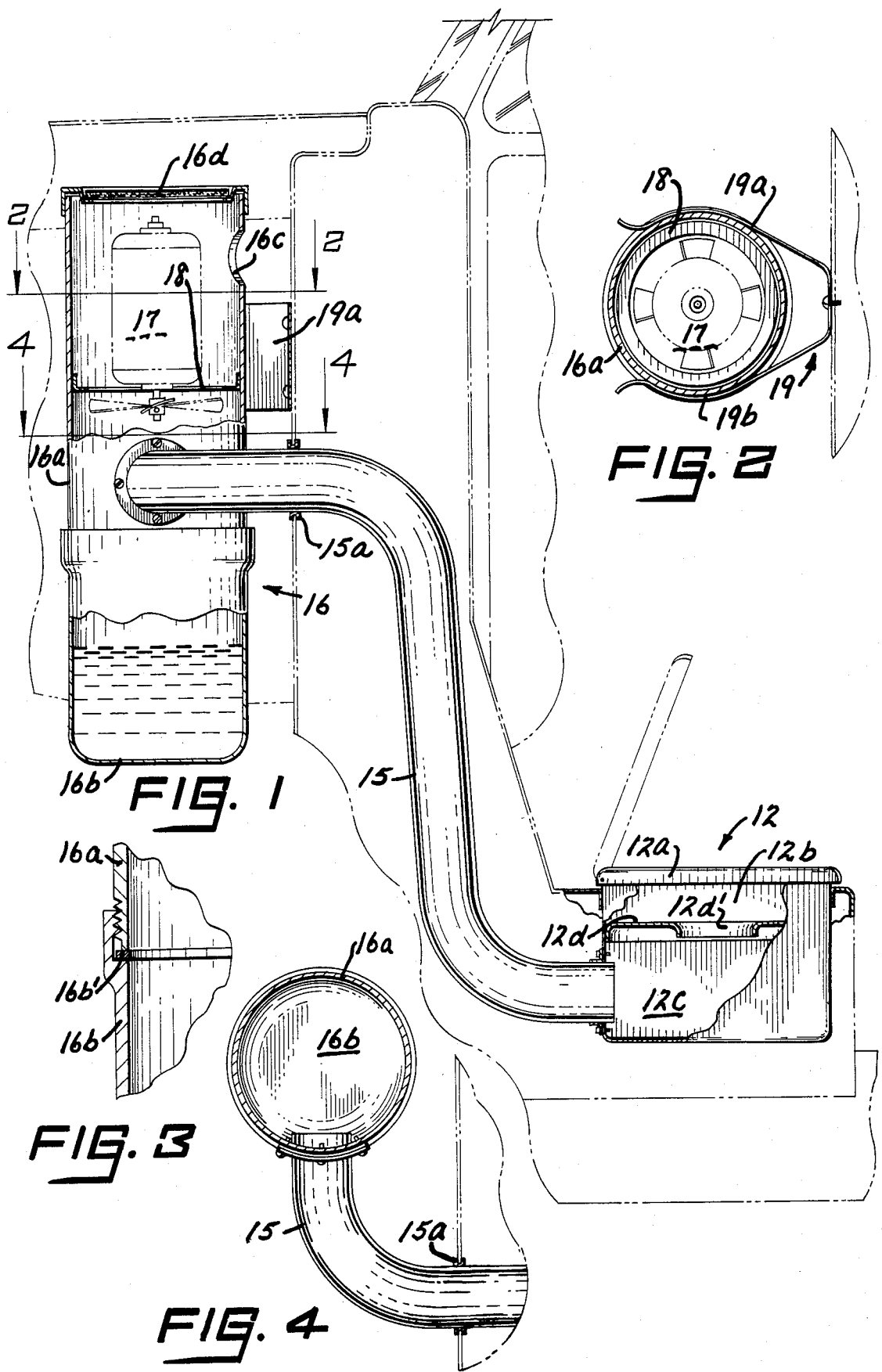

VEHICLE MOUNTED ARRANGEMENT FOR RECEIVING SMOKING RESIDUES OR THE LIKE

As is known, it is quite common for passengers within a vehicle, such as an automobile, to smoke cigarettes, cigars and the like, oftentimes placing the smoking article along the edge of the ashtray or like receiving container during use. When the cigarette or cigar has served its purpose, it is generally crumbled or snuffed out in the ashtray where, sometimes, such remains lighted and a smoldering effect is prevalent. In other words, and particularly to a non-smoker, the burning and/or smoldering of a cigarette or cigar, when placed in an ashtray, is annoying.

The invention overcomes the preceding objections by presenting a receiving container for cigarette, cigar or even pipe ashes, within the passenger compartment of a vehicle, which communicates with a storage receptacle disposed within the engine compartment of the vehicle. The storage receptacle includes an exhaust arrangement whereby smoke, ash, the resulting butt or unused portions of a cigar or cigarette, or the like, are withdrawn from the container within the passenger compartment. The exhausted smoke passes from the storage receptacle through outlet vents or areas into the engine compartment, while the heavier-than-air particles, such as the ash or butts, fall, by gravity action, into a reservoir of water at the bottom of the storage receptacle. The latter is releaseably secured for cleaning and/or water replacement purposes.

More specifically, the invention includes a receiving container placed within the passenger compartment of a vehicle; a flexible conduit leading to a storage receptacle within the engine compartment; exhaust means mounted within the storage receptacle to achieve the withdrawal of smoking residues from the passenger compartment; and, a reservoir of water at the bottom of the storage receptacle, serving collection and flame extinguishing purposes and, as well, residue and/or refuse containment.

The arrangement is such that the exhaust means is selectively operable by a dash mounted switch or automatically, i.e. upon the pivoting of a lid on the receiving container. In any event, exhaust operation affords the added advantage of withdrawing cigarette or cigar smoke which may be present when a user places the smoking article on the receptacle at intervals during smoking. Thus, the invention affords a positive approach in overcoming certain undesirable effects presented by smoking within a vehicle.

A better understanding of the present invention will become more apparent from the following description, taken in conjunction with the accompanying drawing, wherein FIG. 1 is a view in side elevation, partly in vertical section and partly in phantom, showing a smoking residue receiving arrangement in accordance with the teachings of the present invention;

FIG. 2 is a view in horizontal section, taken at line 2—2 on FIG. 1 and looking in the direction of the arrows, showing certain details of the arrangement presented herein;

FIG. 3 is an enlarged fragmentary view, partly in vertical section, of a typical assembly for the water reservoir portion of the storage receptacle; and, FIG. 4 is another view in horizontal section, taken at line 4—4 on FIG. 1, looking in the direction of the arrows, showing still other details of the arrangement of the invention.

For the purposes of promoting an understanding of the principles of the invention, reference will now be made to the embodiment illustrated in the drawing and specific language will be used to describe the same. It will nevertheless be understood that no limitation of the scope of the invention is thereby intended, such alterations and further modifications in the illustrated device, and such further applications of the principles of the invention as illustrated therein being contemplated as would normally occur to one skilled in the art to which the invention relates.

Referring now to the figures, the smoking residue receiving arrangement of the invention is typically disclosed in connection with vehicle usage, such as on an automobile, for example, where a receiving container 12 for the residue is disposed within the passenger compartment of the vehicle, as on the dash or between the front seats, and a storage receptacle 16 used in conjunction therewith is mounted within the engine compartment. A flexible conduit 15, of any desired length, interconnects the receiving container 12 and the storage receptacle 16, extending through the usual fire wall separating the passenger compartment from the engine compartment (shown in phantom in FIG. 1) at 15a.

The receiving container 12, which may include a hinged lid 12a, is generally separable into an upper portion 12b and a lower portion 12c, where, typically, a divider 12d, in the form of a grid including an enlarged opening 12d', serves to define such portions. The divider 12d permits the passage of ash or like residue from a cigarette or cigar into the lower portion 12c and, as well, permits the resting of the smoking article thereon to free the user's hands.

The aforesaid opening 12d' serves passage of larger fragments, such as a cigarette or cigar butt, into the lower portion 12c after smoking has been completed. In any event, the interconnecting conduit 15 extends from the lower portion 12c of the receiving container 12, where the latter may assume, for example, a circular or oblong shape in plan configuration.

The storage receptacle 16, which has an elongated body 16a, includes a selectively removable bottom or liquid/water receiving reservoir 16b. As to the latter, and with respect to FIG. 3, reservoir 16b may threadedly engage the body 16a of the storage receptacle 16, where a gasket 16b' completes the assembly. As to be mentioned again herebelow, the liquid receiving reservoir 16b not only accumulates heavier-than-air particles, but serves flame extinguishing purposes as well.

The elongated body 16a of the storage receptacle 16 mounts a motor driven exhaust fan mechanism 17 mounted on and extending through a plate member 18 (see FIGS. 1 and 2), and includes, for example, one or more venting and/or outlet ports or areas 16c including a filtered top exhaust area 16d. As further evident in FIGS. 1 and 2, the storage receptacle 16 may be mounted between spring urged arms 19a–19b of an engine compartment mounted bracket 19 for ready positioning, where conduit 15 is secured into the mid-portion thereof, i.e. between the exhaust fan mechanism 17 and the water or liquid receiving reservoir 16b.

While not believed necessary to be detailed herein, the exhaust fan mechanism, as stated, is motor driven and includes rotatable fan blades to achieve necessary air movement. The operation of the exhaust fan mechanism may be accomplished by switch means (not shown) on the dashboard in the passenger compartment or, in the alternative, may be automatically operable upon the selective opening of the lid 12a (as shown by the phantom line representation in FIG. 1) of the receiving container 12.

In any event, the invention serves multi-functions, to-wit, the exhaust of smoke from a lighted cigarette or cigar placed during smoking by the user on the divider 12d; and, the passage of ash or lighter-than-air particles and/or heavier particles, such as cigarettes and cigar butts, from the receiving container 12, within conduit 15, and from the storage receptacle 16, either through outlet vents 16c and the filtered vent area 16d or, in the instance of heavier-than-air particles, by gravity, into the water reservoir 16b, the latter assuring that any lighted butt or smoking by-product is extinguished.

From the preceding, it should be evident, that the smoking residues receiving arrangement presented herein is an effective adjunct to passenger comfort, as well as added safety, during usage of smoking articles within the passenger compartment of a vehicle. Not only is an abundance of smoke exhausted particularly in the instance where the smoking article is placed or positioned on the receiving container, during the interval of smoking, but any lingering odor from an extinguished cigarette or cigar butt is eliminated through the passage and depositing thereof into the water or liquid reservoir of the storage receptacle. Moreover, the latter also serves flame extinguishing purposes. Since, as stated, the liquid or water reservoir is removable, cleaning and liquid replacement is readily accomplished.

The arrangement is operable, as stated, by a switch located in the passenger compartment of the vehicle or automatically (by reason of the raising of the receiving container lid), effectively initiating exhaust action through the fan mechanism, whereby the undesirable contaminated air is caused to flow into the engine compartment. Any particles incapable of being carried by air flow through the venting or outlet ports fall into the reservoir.

The smoking residues receiving arrangement described hereabove is susceptible to various changes within the spirit of the invention as, for example, in proportioning; the manner of positioning and/or mounting either the receiving container or the storage receptacle; the number and position of venting outlets in the storage receptacle; the type of liquid used in the reservoir of the storag receptacle; the particular exhaust means and switching employed; and, the like. Thus, the preceding should be considered illustrative and not as limiting the scope of the following claims.

I claim:

1. An arrangement for receiving smoking residues in a vehicle having a passenger compartment and an engine compartment comprising a receiving container disposed within said passenger compartment, a storage receptacle disposed within said engine compartment serving to withdraw and separate air carried and heavier-than-air smoking residues, and a conduit interconnecting said receiving container and said storage receptacle, said storage receptacle including rotatable exhaust means disposed above the entry of said conduit into said storage receptacle, venting means communicating with said rotatable exhaust means, and a water containing reservoir disposed below the entry of said conduit into said storage receptacle, where said exhaust means removes said smoking residues from said receiving container through said conduit, where heavier than air smoking residues gravity feed into said water containing reservoir, and where other of said smoking residues carried by air pass from said storage receptacle through said venting means.

2. The arrangement of claim 1 where operation of said exhaust means is selectively initiated by switching means disposed within said passenger compartment.

3. The arrangement of claim 1 where operation of said exhaust means is selectively initiated by movement of a lid pivotally mounted on said receiving container.

4. The arrangement of claim 1 where said water containing reservoir is selectively removable from said storage receptacle.

* * * * *